Feb. 9, 1932.   H. DIERKING ET AL   1,844,565
ROOT DIGGER
Filed Feb. 2, 1931

Inventors
Henry Dierking
Raymond Derby
By their Attorneys
Merchant & Kilgore

Patented Feb. 9, 1932

1,844,565

UNITED STATES PATENT OFFICE

HENRY DIERKING AND RAYMOND DERBY, OF FARIBAULT, MINNESOTA, ASSIGNORS TO ANDREWS NURSERY COMPANY, OF FARIBAULT, MINNESOTA, A CORPORATION OF MINNESOTA

ROOT DIGGER

Application filed February 2, 1931. Serial No. 512,810.

Our invention relates to root diggers of the type especially adapted for use by nurseymen in digging small trees, shrubs or plants, that have been planted in rows or beds, and provides an attachment or auxiliary device which, in the digging operation, not only lifts the loosened and more or less pruned roots from the ground, but loosens up and shakes the dirt from the roots. Generally stated, the invention consists of the novel construction, combination and arrangement of parts hereinafter described and defined in the claims.

Root diggers for the purpose above set forth have hitherto been provided with approximately U-shaped cutting blades combined with means for drawing the same through the ground under the major portions of the roots to thereby cut the roots loose from the ground and loosen up the soil. Attachments have hitherto also been applied to the cutting blades for lifting the several roots from the ground, but such attachments have been rigid in respect to the cutting blades and in the lifting operation, simply raised up the roots and much of the dirt without loosening to any considerable extent the earth from the roots. It is a common practice, in preparing small trees, shrubs, plants and the like for winter storage and for shipment, to remove the dirt from the roots, leaving the roots substantially clean; and with the old form of diggers, it has therefore been necessary to pull up the severed roots and loosen and shake the dirt from the same before storage or shipment. Our invention provides a lifting plate with means for shaking or vibrating the same vertically during the lifting operation and which cleans the dirt from the lifted roots as stated in the above introductory paragraph.

The invention is illustrated in the accompanying drawings wherein like characters indicate like parts throughout the several views.

Referring to the drawings.

Figure 1:
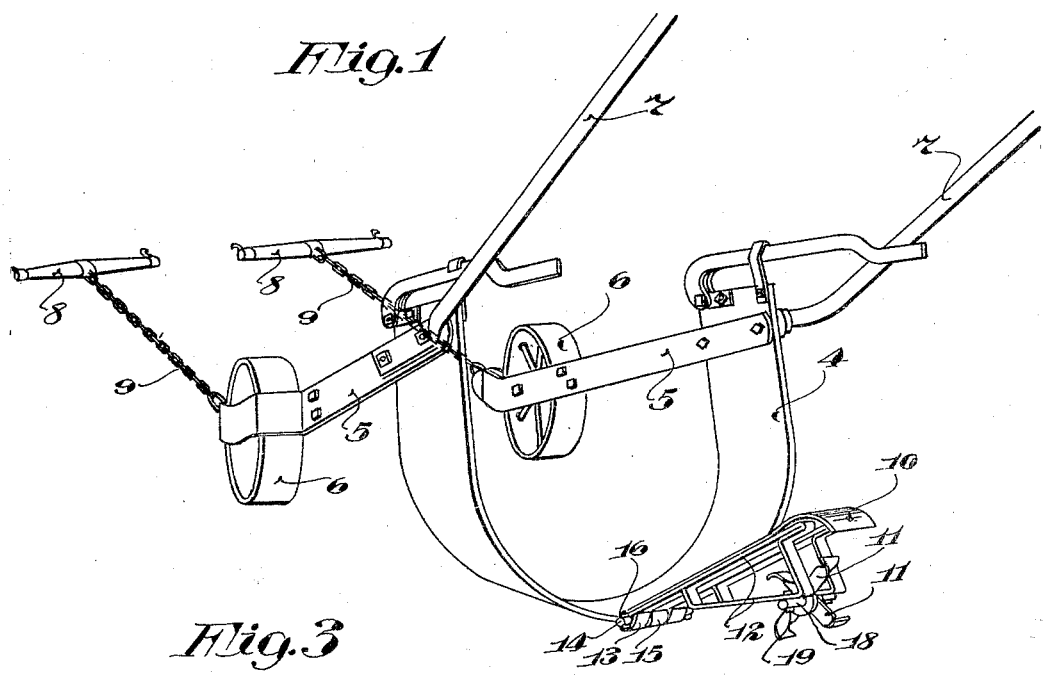
Fig. 1 is a perspective showing our improved lifting and shaking device attached to a root digger involving the customary U-shaped form of the cutting blade.
Figure 3:
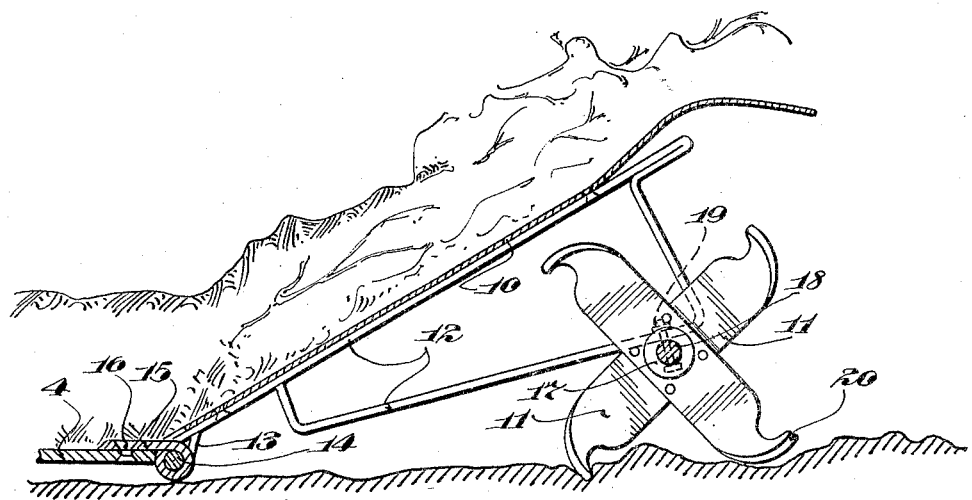
Fig. 3 is a section taken on the line 3—3 of Fig. 2.
Figure 2:
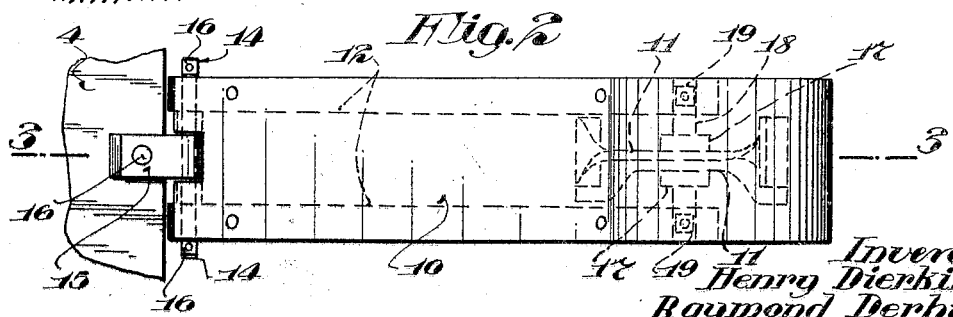
Fig. 2 is a plan view of the attachment showing also a fragment of the cutting blade to which it is attached.

The parts of the digger proper or digger minus lifting and shaking attachment may be briefly noted as follows:

The U-shaped cutting blade 4 preferably a tempered steel blade, is attached to the rear ends of laterally spaced draw bars 5 which, at their front ends, are equipped with ground-engaging wheels 6. The blade 4 may be adjustably or otherwise secured to the draw bars 5 but for the purpose of this case, may be treated as if rigidly attached thereto. Hand bars 7 are attached to the rear ends of the draw bars 5 and draft devices such as whiffle trees 8 are shown as attached to the front ends of the draw bars 5 by chains 9. A device of this character is adapted to be drawn forward and forced through the ground in position to properly cut the roots, by horses attached to the whiffletrees 8 and driven on opposite sides of the row of trees, shrubs, plants or the like.

The lifting and shaking attachment involves a flat metal plate 10 and a shaker wheel 11. The plate 10 is rigidly secured on the upper bars of laterally spaced runner frames 12, the front ends of which are bent to form sleeve-like bearings 13 that are pivotally connected by a short hinge bolt 14 to a hinge lug 15. This hinge lug 15 is riveted, bolted or otherwise secured to the rear bottom portion of the blade 4 and preferably such connection is made detachable by means of a nut-equipped bolt 16.

The shaker wheel 11 may take various forms but must have an irregular peripheral portion so that when rotated, it will produce an upward and downward movement of its axis even if running on smooth ground. As shown, said shaker wheel is made up of two intermediately connected bars riveted together at their central portions and secured to a hub 17 which, as shown, is journaled on a spindle or dead axle 18, the ends of which are rigidly secured to the rear bottom portions of the runner frames 12 by means of nut-equipped bolts 19 or the like. The free ends of the arms of shaker wheel 11 are twisted laterally and bent circumferentially at 20 to afford end portions that will take a good grip on the ground and cause a positive rotation of the shaker wheel when the digger is drawn forward.

When the digger with the attachment described is drawn through the ground with the blade 4 embedded in the ground far enough to pass beneath main body of the roots, the roots will, of course, be severed from the ground and immediately after being severed, plate 10 will lift the severed roots and all the while that they are being lifted, the said plate will be given an upward and downward vibratory or shaking movement which will loosen and remove the dirt from the roots. This leaves the roots free from dirt so that they may be easily and rapidly picked up in condition for storage and shipment without requiring the hitherto necessary hand or manual shaking operation. As is obvious, the so-called runner frames 12, in addition to affording suitable connection between the shaker wheel and the lifter plate, limit the possible downward movement of the shaker plate even when the device is working in very soft ground.

This device or attachment is therefore a great labor-saving device. In actual practice, the device described has been found highly efficient for the purposes had in view.

What we claim is:

1. The combination with a root digger involving an approximately U-shaped cutter blade and means for guiding the same through the earth to sever roots from the ground, of a lifting plate pivotally attached to the lower portion of said blade, and a shaker wheel journaled to the rear portion of said lifter plate and having an irregular periphery arranged to vibrate vertically the rear portion of said lifter plate under forward movement of the digger.

2. The combination with a root digger involving an approximately U-shaped cutter blade and means for guiding the same through the earth to sever roots from the ground, of a lifting plate pivotally attached to the lower portion of said blade, laterally spaced runner frames secured to the under side of said lifter plate, and a shaker wheel working between and journaled to said runner frames and having irregular peripheral ground-engaging portions arranged to vibrate vertically the rear portion of said lifter plate, under forward movement of the digger.

3. The combination with a root digger involving an approximately U-shaped cutter blade and means for guiding the same through the earth to sever roots from the ground, of a lifting plate pivotally attached to the lower portion of said blade, laterally spaced runner frames secured to the under side of said lifter plate, a spindle rigidly secured to the lower rear portions of said runner frames, and a shaker wheel journaled on said spindle between said frames, said wheel comprising rigidly connected transversally intersecting metal bars having end portions that are bent laterally and circumferentially for engagement with the ground.

In testimony whereof we affix our signatures.

HENRY DIERKING.
RAYMOND DERBY.